(12) United States Patent
Nakagawa et al.

(10) Patent No.: US 8,476,549 B2
(45) Date of Patent: Jul. 2, 2013

(54) METHOD FOR BONDING A SEAL MEMBER AND DISSIMILAR MATERIALS MADE FROM METALS

(75) Inventors: Shigeyuki Nakagawa, Yokosuka (JP); Minoru Kasukawa, Tokyo (JP); Kenji Miyamoto, Yokosuka (JP); Hiroshi Sakurai, Chigasaki (JP); Chika Yamamoto, Tokyo (JP); Takashi Miyamoto, Higashiyamoto (JP); Akira Fukushima, Ibaraki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1128 days.

(21) Appl. No.: 11/781,555

(22) Filed: Jul. 23, 2007

(65) Prior Publication Data
US 2008/0026247 A1    Jan. 31, 2008

(30) Foreign Application Priority Data
Jul. 25, 2006  (JP) ................................. 2006-201861

(51) Int. Cl.
 *B23K 11/00*  (2006.01)
 *B23K 1/00*   (2006.01)
 *B23K 11/31*  (2006.01)

(52) U.S. Cl.
 CPC ............. *B23K 11/002* (2013.01); *B23K 1/0004* (2013.01); *B23K 11/31* (2013.01)
 USPC ......................................... 219/78.01; 428/649

(58) Field of Classification Search
 USPC ........................ 219/86.1, 91.2, 92, 117.1, 118
 See application file for complete search history.

(56) References Cited

U.S. PATENT DOCUMENTS

| 2,452,805 | A |   | 11/1948 | Sussenbach |
|---|---|---|---|---|
| 4,122,325 | A | * | 10/1978 | Featherstone et al. ....... 219/86.1 |
| 4,656,814 | A |   | 4/1987  | Lockington |
| 5,742,020 | A |   | 4/1998  | Adachi et al. |
| 6,861,609 | B2 | * | 3/2005 | Sigler ......................... 219/117.1 |
| 2006/0150387 | A1 | * | 7/2006 | Kobayashi et al. ............. 29/458 |

FOREIGN PATENT DOCUMENTS

| GB | 697 396     |   | 9/1953 |
|----|-------------|---|--------|
| JP | 63-068278   |   | 3/1988 |
| JP | 02-078541   |   | 3/1990 |
| JP | 04-251676   |   | 9/1992 |
| JP | 06-055277   |   | 3/1994 |
| JP | 06122078  A | * | 5/1994 |
| JP | 08-270499   |   | 10/1996 |
| JP | 2000-272541 |   | 10/2000 |
| JP | 2005-154844 |   | 6/2005 |
| JP | 2006175504 A | * | 7/2006 |
| JP | 2007-130686 A |  | 5/2007 |

* cited by examiner

*Primary Examiner* — Henry Yuen
*Assistant Examiner* — Thien S Tran
(74) *Attorney, Agent, or Firm* — Young Basile

(57) ABSTRACT

A method of bonding dissimilar metals, a bonding structure formed by such a method and a bonding apparatus for performing such a method. The resulting bond is capable of preventing corrosion (e.g., electric corrosion) resulting from contact of the dissimilar metals and obtains a dissimilar material joint exhibiting anti-corrosive property and bonding strength at low costs. The method includes overlapping two materials made from dissimilar metals having a seal material interposed therebetween and discharging the seal material from a bonding interface and bonding the two materials in direct contact with each other.

15 Claims, 18 Drawing Sheets

METHOD FOR BONDING A SEAL MEMBER AND DISSIMILAR MATERIALS MADE FROM METALS

CROSS-REFERENCE TO RELATED APPLICATION

This application claims priority from Japanese Patent Application Serial No. 2006-201861, filed Jul. 25, 2006, which is incorporated herein in its entirety by reference.

TECHNICAL FIELD

The invention relates in general to a method for bonding dissimilar materials made from metals with different ionization tendencies, a bonding structure for dissimilar metals formed by using such a method and an apparatus for bonding dissimilar materials made from metals for use in such a method.

BACKGROUND

Steel has been widely used in forming a vehicular body. However, in addition to steel, light metal such as aluminum alloy has been recently used in order to reduce the weight of the vehicular body. Further, vehicular body members (e.g., an aluminum alloy roof panel, etc.) made from aluminum alloy, etc. can be applied to the vehicular body.

When a combination of dissimilar metals is used in the bonding portion of a body member, the dissimilar metals contact each other and permit conduction of electricity. This can accelerate corrosion.

The corrosion due to the contact of the dissimilar metals occurs because there is a voltage difference between these metals, which is caused by a difference in the ionization tendencies of the respective materials. Thus, corrosive currents flow between the dissimilar metals. In order to prevent such corrosion due to the contact of the dissimilar metals, several approaches have been suggested.

Japanese Laid-Open Patent Publication No. 2000-272541 discloses a bonding structure for a vehicular body member in which a first member made from steel and a second member made from aluminum or aluminum alloy are bonded by a bonding means such as a rivet or a reinforcing member, while interposing a seal material between the members.

Further, Japanese Laid-Open Patent Publication No. 2005-154844 discloses a method comprising the steps of immersing a bonding member of a iron-based material and an aluminum or aluminum alloy material into a solution containing a fluoro-complex ion and a zinc ion; and educing a metallic zinc around a bonding portion, wherein the metallic zinc has high density, rigidity and adhesiveness in addition to an ionization tendency ranging between those of aluminum and iron to provide an improved protection against corrosion due to the contact of the dissimilar metals at the bonding portion.

BRIEF SUMMARY

Disclosed herein are methods of bonding dissimilar metallic materials. One example of such a method comprises overlapping two materials, the two materials made from different metals with a seal material interposed therebetween, discharging the interposed seal material disposed at least at a middle portion of a bonding region from a bonding interface and bonding the two materials by directly contacting the materials to each other.

Also disclosed are the resulting structures. One structure comprises, by example, at least two different metallic materials bonded to one another at a bond region, the bond region including a direct contact region between the two different metallic materials and an enclosure surrounding the bond region, the enclosure composed of at least one of a third metal different from the two metallic materials, an oxide film, and reaction products generated during the bond-forming process. This structure also includes a supplemental enclosure composed of a seal material.

An apparatus for bonding materials made from dissimilar metals having a seal material disposed therebetween are also taught. One such apparatus comprises means for discharging seal material from a bonding interface and means for directly bonding two materials upon discharge of the seal material.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
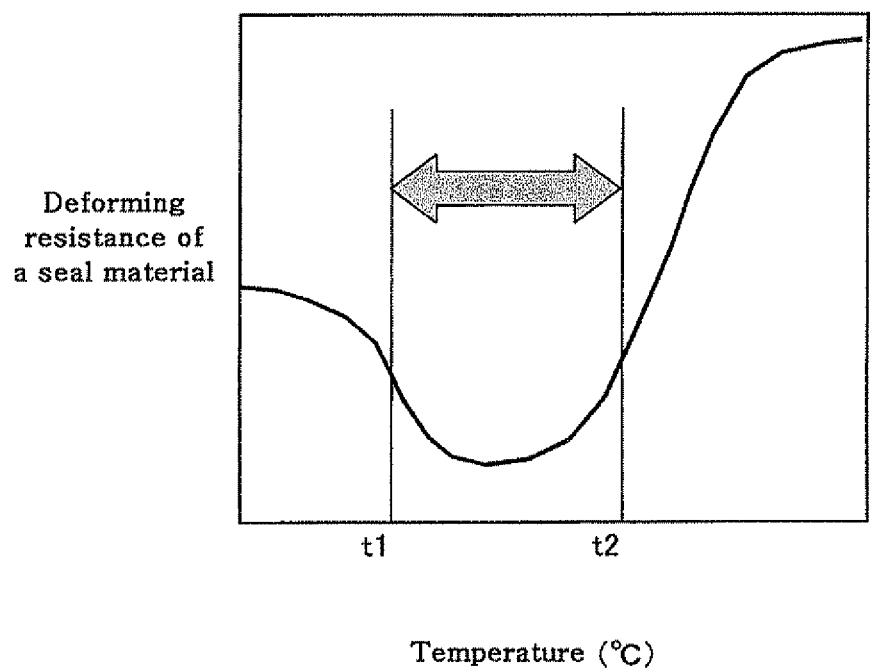
FIG. 1 illustrates a graph showing a temperature characteristic of a deforming resistance of a seal material.

In Japanese Laid-Open Patent Publication No. 2000-272541 discussed above, since both materials have different melting points and linear expansion coefficients, mechanical fastening using rivets, bolts and the like is used instead of fusion bonding such as spot welding. Therefore, there is a problem in that the weight and costs of the bonded members are inevitably increased.

Further, in Japanese Laid-Open Patent Publication No. 2005-154844, the bonded members are immersed into the solution containing fluoro-complex ion and zinc ion. However, the anti-corrosive property required by the vehicular components may not be satisfied with zinc ion educed on the surface of the bonding material. In addition, if the process of immersing the vehicular components into the solution is incorporated into the production process of the vehicle, then new equipments such as an immersing tank will be required. Therefore, the costs associated with equipment and maintenance will be increased, which inevitably leads to increased manufacturing costs.

Thus it is desirable to provide a method of bonding heterogeneous/dissimilar metals that provide a robust bond. It is also desirable to provide a method of bonding dissimilar metals that is capable of preventing or reducing corrosion due to the contact of the dissimilar metals and obtaining a dissimilar material joint having excellent anti-corrosive properties and bonding strength.

A method and apparatus of bonding dissimilar metals as disclosed herein, as well as a bonding structure obtained by such method, is explained below in detail.

In the method of bonding dissimilar metals as disclosed herein, a seal material interposed between overlapped dissimilar metallic materials is forcedly removed from a bonding interface of a bonding portion, thereby bonding (i.e., welding) the dissimilar metallic materials while they are in direct contact with each other. Accordingly, the deterioration in strength of a joint caused by the seal material remaining at the bonding interface is prevented. Further, the contact of metals with different ionization tendencies is prevented by the seal material. Therefore, both the strength and anti-corrosive property can be improved.

It is contemplated that the process disclosed herein can be completed using existing equipment. As such, this clearly minimizes any cost-increasing factors such as increasing seal material costs or the number of displacement processes.

In the method as disclosed herein suitable materials including, but not limited to, epoxy resin-based, synthetic rubber-based or synthetic rubber/PVC-based materials may be used as the seal material. Such a material may be applied on a bonding surface of a bonded material in a liquid state, or may be interposed between both materials in a sheet-like shape. Various other seal materials may be employed in the process disclosed herein. Suitable materials will exhibit an insulating property for preventing a direct contact between associated dissimilar metallic materials. The seal material of choice may exhibit adhesive properties. It is contemplated that by using an adhesive material as the seal material, the effect of improving the bonding strength in addition to preventing electrical corrosion can be obtained.

In the method disclosed herein the seal material is discharged from the bonding interface. This can be accomplished by various methods. One nonlimiting example of a specific way of discharging the seal material from the bonding interface is to press both materials against each other using an indenter having a curved tip end surface and discharge the seal material interposed between the bonding interfaces around the bonding portion.

In such a case, the indenter may be roller-shaped to thereby discharge the seal material in both lateral directions. This may also be applied to a continuous linear bonding.

Alternatively, at least one bonding surface of both materials may have a protruding bending portion facing the opposite bonding surface. In such instances, both materials may be pressed against each other. As such, the seal material can be smoothly discharged from the bonding interface by the bending portion.

Such a bending portion may be formed intermittently as through press processing, conforming to a welding position (e.g., for spot welding), or may be formed in a continuous groove shape to conform to a bonding line. As such, the shape of the bending portion may be determined by the shape of a member to be applied or as required for performance. Further, when the seal material is discharged from the bonding interface, it may be possible to press both materials after the deforming resistance of the seal material is reduced (e.g., by heating it with an external heat source). Accordingly, the seal material can be easily and effectively discharged from the bonding portion even with a low pressing force. Also, the available types of seal materials can be extended depending on the processing environment.

The deforming resistance of the seal material (e.g., material made from thermosetting resin) depends on the temperature, as shown in FIG. 1. Accordingly, as the temperature is gradually increased from room temperature, the deforming resistance will be gradually reduced until it reaches a certain temperature. On the other hand, when the temperature further increases, the deforming resistance will be increased as it starts hardening due to its thermosetting property.

Accordingly, pressing may be performed after the bonding portion is heated using the external heat source such that the temperature of the seal material is maintained at a temperature ranging from t1 to t2, as shown in FIG. 1. Further, the deforming resistance of the seal material is maintained at less than a predetermined value. In this way, the seal material can be easily and effectively discharged from the bonding portion.

The external heat source for controlling the deforming resistance of the seal material may be any suitable mechanism or device. Various nonlimiting examples include a hot roller having a heater installed therein, a high-frequency heater, a laser heater or a resistance heater.

In the method of bonding dissimilar metals as disclosed herein, various welding methods may be applied and include but are not limited to processes such as resistance welding, laser welding and high-frequency welding, as well as solid-state bonding methods such as frictional stirring bonding, ultrasound bonding and diffusion bonding. However, it has been found when employing a resistance welding that if at least one of an end surface of the resistance welding electrode (including spot welding electrode and seam welding roller electrode) is formed with a convex surface, then it is possible to discharge the seal material from the bonding interface by pressing with the electrode.

Thus, the welding electrode may also serve as a way of discharging the seal material from the bonding interface, thereby contributing to simplify the apparatus and process simplification.

For such resistance welding, seam welding may be employed in addition to spot welding techniques. It is possible to bond members made from dissimilar materials having a complex three-dimensional shape such as vehicular panels by point bonding using the resistance spot welding method.

Further, by applying resistance seam welding, a continuous line shaped bond may be formed that is proper for members requiring rigidity or water-proof property compared to point bonding.

When performing resistance spot welding, prior to electrical conducting and pressing for performing main welding operations, resistance heating can be performed between both materials by preliminary pressing and conducting weak current in order to reduce the deforming resistance of the seal material. This facilitates the ultimate discharge of the seal material from the bonding interface.

In the resistance seam welding process, a roller electrode for such preliminary conduction is disposed ahead of the resistance welding roller electrode, thereby obtaining the same effects.

In the method of bonding dissimilar metals as disclosed herein, it can be desirable to interpose a material when the bonding material is made from a third metal between at least one side of the bonding material made from the dissimilar metal and the seal material. In such a case, the third metal differs from the bonding and seal materials. Further, the seal material is discharged from the bonding interface. Then, the materials are bonded by a process such as a eutectic fusing between at least one of the materials and the third metallic material. Thus, since eutectic fusion is performed at a relatively low temperature in the dissimilar metallic interface, it is possible to remove any oxide film from the bonding interface at lower temperatures. This prevents the creation of undesirable metallic compounds by preventing a temperature increase in the bonding interface and securely bonding newly formed surfaces of both materials made from the dissimilar metal. Therefore, it can be appropriately used for bonding the dissimilar metal including materials such as aluminum, aluminum alloys, or magnesium material, on which a fine oxide film is formed.

Without being bound to any theory, the process of bonding dissimilar metals including materials such as aluminum and/or magnesium compounds, an input of a large amount of heat has been necessary in order to remove the oxide film. If the heat input is increased, the formation of the metallic compound between weak metals cannot be avoided. Thus, the condition range for obtaining hard and high tension bonding becomes narrower. It has been found, quite unexpectedly, that the oxide film can be easily removed at a low temperature by using the eutectic fusing with the third material as described above. Thus, the optimal condition range can be broadened.

A third metallic material can be interposed by any suitable method. One non-limiting example includes plating the third metallic material on at least one of the bonding surfaces of the materials to be bonded. Where desired or required, it is also contemplated that a material insert can be employed. However, it can be appreciated that the plating process improves operational efficiency by reducing the number of manufacturing processes. Further, a very clear new surface is formed from a lower portion of the plated layer after the plated layer fused by the eutectic fusing is discharged along with impurities of the surface around the bonding portion. Therefore, more secure bonding operations can be performed.

For example, when bonding a light alloy such as an aluminum alloy or magnesium alloy with steel, a so-called zinc-plated steel sheet can be used as the steel. In such instances zinc serves as a third metal forming a low fusing point eutectic process with aluminum or magnesium, and is pre-plated on a surface of the sheet. In such a case, there is no need to additionally carry out the plating or specific preparation. Further, since steel sold in the market can be used, on which zinc is plated for rust prevention, it is possible to perform a secure bonding of the dissimilar metal in a very simple and cheap way.

As used herein, the term eutectic fusing means fusing by using a eutectic reaction. When eutectic composition in inter-diffusing area formed by inter-diffusing two metals (or alloys) becomes a eutectic composition, if the temperature is maintained over a predetermined eutectic process temperature, the materials are liquefied by the eutectic reaction. For example, in case of aluminum and zinc, the fusing points of aluminum and zinc are 933K and 692.5K, respectively, whereas the eutectic composition is fused at a temperature of 655K lower than the fusing point of the respective metal.

Therefore, the eutectic reaction occurs when the clear surfaces of both metals are contacted, and heating at a temperature over 655K is maintained. Such reaction is referred to as eutectic fusing. Lower temperature bonding can be carried out by using eutectic fusing in a bonding operation such as oxide film removal or inter-diffusion for bonding the aluminum material. Further, by performing eutectic fusing, the growth of metallic composition in the bonding interface can be effectively restrained. Furthermore, although Al-95% Zn is eutectic-composed in Al—Zn binary alloy, the eutectic reaction itself occurs constantly, irrelevant to alloy ingredients. The alloy composition is relevant to increasing or reducing the amount of eutectic reaction rather than triggering the reaction.

Although there can be an oxide film on a surface of the aluminum face, such a film can be physically destroyed where a plastic deformation in the aluminum material is generated by heating using high energy beam irradiation and pressing at a desired temperature immediately thereafter.

That is, since microscopic convexes on the material surface cause friction against each other through pressing, the eutectic fusing occurs in a region where the aluminum and zinc are in contact due to a localized destruction of a part of the oxide film. Further, liquid generated by the eutectic fusing process causes the oxide film, which is positioned nearby, to be broken and disassembled. Through such reaction expansion where the eutectic fusing is expanded through an entire surface, an acceleration of oxide film destruction and a bonding in liquid state is achieved.

The eutectic composition can be spontaneously achieved by inter-diffusion. Thus, control of the composition is not necessary. The essential conditions for the inter-diffusion process are that the eutectic reaction occurs at a low fusing point between two types of metals or alloys. Further, in case of eutectic fusing of aluminum and zinc wherein Zn—Al alloy is used instead of Zinc, at least 95% of the composition should consist of Zinc.

Several compositions of the material to be bonded and the third metallic material may used in the bonding method of the dissimilar metal as disclosed herein. For example, the third material for use in the bonding of the steel and the aluminum alloy material should not be specifically limited. That is, any materials, together with aluminum alloy, that trigger a eutectic process at a low fusing point including, but not necessarily limited to, Cu, Sn, Ag, Ni, etc. (in addition to the above Zn), may be used.

Thus, the eutectic metal of these metals and Al will be fused below a melting point of the aluminum alloy base material. Accordingly, even when the steel and aluminum alloy materials, which exhibit a tendency of generating brittle intermetallic compound, are bonded, oxide film can be removed at a lower temperature and the generation of the intermetallic compound at the bonding interface can be restrained. This allows for secure bonding.

Further, when the method of bonding as disclosed herein is applied to a vehicular body assembly, the bonded material will generally be a combination of steel and aluminum materials. However, the combination of steel and magnesium materials or the combination of aluminum and magnesium materials may be employed.

When steel and magnesium alloy are bonded, it is possible to bond these materials by causing eutectic reaction between zinc, which is plated to the steel, and magnesium, as explained below. Further, when the aluminum alloy and the magnesium alloy are bonded, it is contemplated that materials such as zinc or silver may be employed as a third material.

Further, as disclosed herein, it should be noted that the third metallic material is not limited to pure metal. Since the eutectic metal may be a binary alloy or a tertiary alloy, the third metallic material may be at least one of these materials.

The apparatus of bonding dissimilar metals as disclosed herein may include a device for discharging the seal material from the bonding interface and a welding device for directly bonding both materials with the seal material being discharged from the materials.

Further, the device for discharging the seal material may include a heating device for reducing a deforming resistance of the seal material and a pressing device for discharging the seal material from the bonding interface, wherein the deforming resistance of the seal material is reduced by pressing a portion heated by the heating device (i.e. softened by heating).

It is contemplated that the welding device may include devices such as resistance welding devices or laser beam welding devices. The heating device of the device for discharging seal material may include, but need not be limited to, devices such as hot rollers having a heater therein, high-frequency heaters, a laser heater or resistance heaters. While the pressing surface may have any suitable configuration, convex surfaces are desirable in certain applications.

Further, when the resistance welding is employed as welding means, the welding electrodes may also serve as the pressing means.

The method and apparatus disclosed herein is explained in detail by referring to the following embodiments. The disclosure is not to be construed as limiting as the disclosure is considered applicable to all dissimilar metal bonding having electrical corrosion changes such as magnesium alloy, aluminum alloy, steel, magnesium alloy, etc.

In each embodiment, a 0.55 mm-thick zinc-plated steel sheet 1 and a 1.0 mm-thick aluminum alloy material 2 made of 6000-class aluminum alloy is bonded. Further, a zinc-plated layer 1p formed on the surface of the zinc-plated steel sheet 1 is used as a third material triggering eutectic fusion with aluminum. Although the thickness of the zinc-plated layer 1p may be determined to be greater than a minimum value that causes the eutectic fusion, in the various embodiments a zinc-plated sheet steel 1 having a plating thickness of 20 μm is used. An epoxy-based thermosetting adhesive is used as an anti-corrosive seal material 3. The seal material 3 is interposed between both the zinc-plated steel sheet 1 and the aluminum alloy material 2 overlapped with the zinc-plated layer 1p facing an inner side.

First Embodiment

Figure 2:
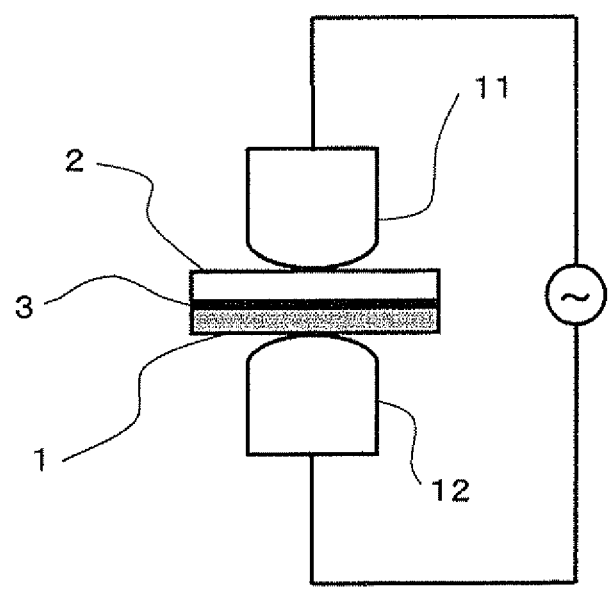
FIG. 2 is a schematic view illustrating a constitution of a resistance spot welding apparatus constructed in accordance with an embodiment disclosed herein.

FIG. 2 illustrates a spot welding device employed in the first embodiment. The zinc-plated steel sheet 1 and the aluminum alloy material 2 having the seal material 3 interposed therebetween are welded by pressing and conducting with a pair of welding electrodes 11 and 12 using an alternating current supply device.

Figure 3:
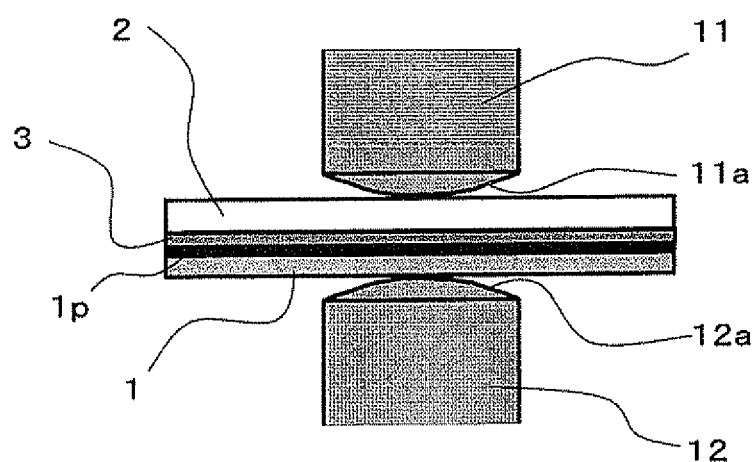
FIG. 3 is a detailed view of a resistance spot portion in accordance with a first embodiment disclosed herein.

FIG. 3 illustrates a bonding portion in detail. The zinc-plated layer 1p is formed on the surface. Further, the seal material 3 is interposed between a bonding interface of the zinc-plated steel sheet 1 and the aluminum alloy material 2.

The spot welding electrodes 11 and 12 include convex surfaces 11a and 12a at their ends so as to easily discharge the seal material 3, an oxide film and a eutectic fused body from the bonding interface, as explained below.

It is to be understood that both electrodes 11 and 12 do not necessarily have the shape of the end of the electrode. At least one of the electrodes 11 and 12 may have such a shaped end to perform smooth discharge.

Also, a pressing force of 350 kgf is applied using the resistance spot welding device prior to discharging the seal material 3 from the bonding interface. Then, an alternating current of 25000 A is conducted for 0.2 seconds to spot weld both the zinc-plated steel sheet 1 and the aluminum alloy material 2. The following process is explained by referring to FIG. 4.

Figure 4:
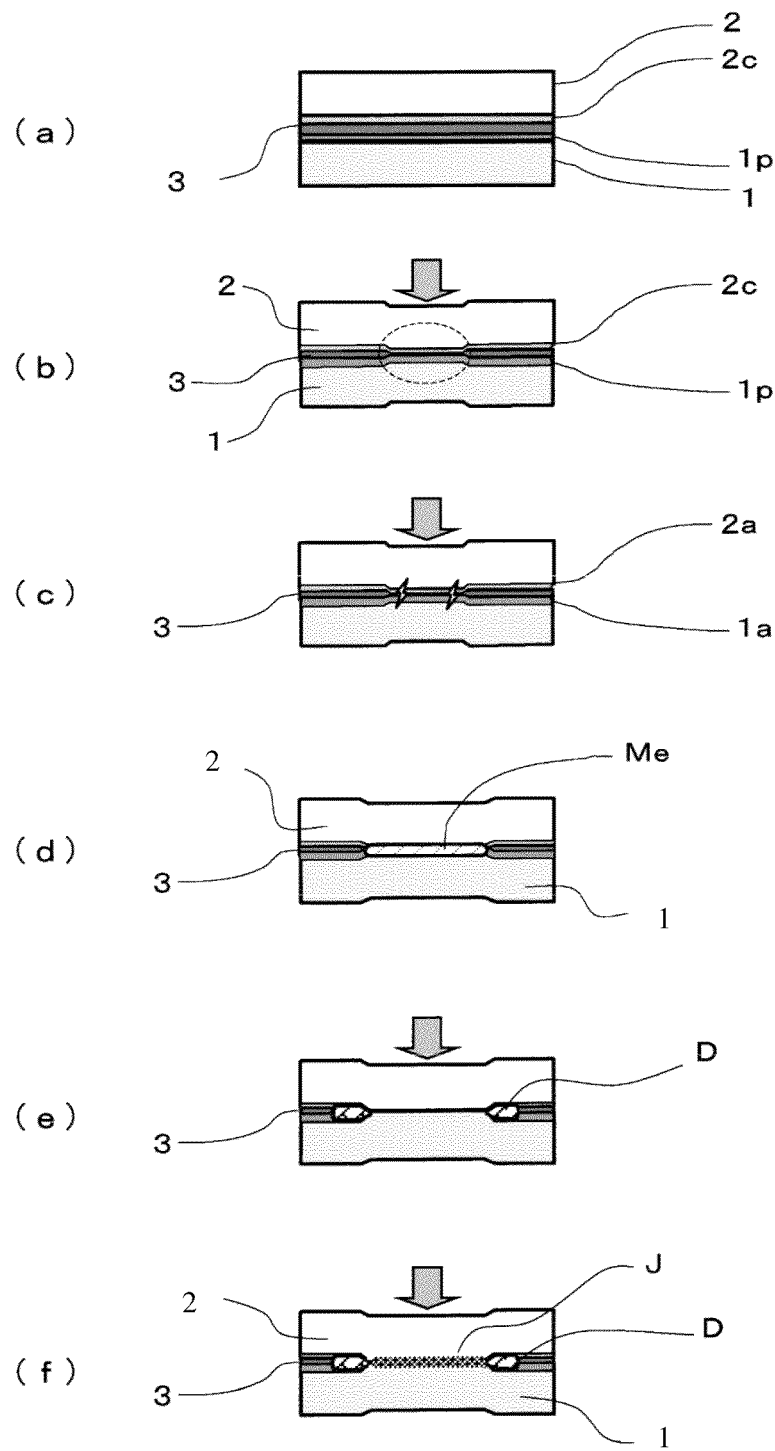
FIG. 4 illustrates bonding processes for a zinc-plated steel sheet and an aluminum alloy material.

In FIG. 4, (a) illustrates materials that are prepared for bonding. The zinc-plated steel sheet 1 and the aluminum alloy material 2 are overlapped with each other, wherein the zinc-plated layer 1p is coated on the zinc-plated steel sheet 1. The zinc-plated layer 1p serves as a third metallic material, which causes a eutectic reaction with aluminum at least on the surface of the bonding interface side. A seal material 3 having a paste-like shape and consistency is applied on the entire bonding surface of both materials. Additionally, an oxide film 2c is formed on the surface of the aluminum alloy material 2.

Next, as shown in (b), when both the zinc-plated steel sheet 1 and the aluminum alloy material 2 are pressed by a pair of welding electrodes 11 and 12, since the convex surfaces 11a and 12a are formed at the ends of the electrodes as mentioned above, the seal material 3 is discharged from the middle of the bonding portion to the outer periphery. Further, at the middle portion, the zinc-plated layer 1p and the oxide film 2c formed on the aluminum alloy material 2 contact each other. Here, a mechanical or thermal shock is applied by a suitable press and conducted by the welding electrodes. Therefore, as shown in (c), the oxide film 2c of the bonding surface is locally broken. Further, the zinc and aluminum are locally contacted in a manner that maintains the temperature of the bonding surface above the eutectic temperature point of the zinc and aluminum. Thus, the eutectic fusion of zinc and aluminum occurs to thereby produce a eutectic fused body Me, as shown in (d).

The eutectic fused body (i.e., fused metal) Me is discharged as a discharging product D around the bonding portion together with the oxide film 2c or impurities (not shown) of the bonding interface by further pressing the electrodes 11 and 12. Accordingly, a desired bonding area is secured as shown (e).

Further, as shown in (f), newly formed surfaces of the aluminum and steel are directly bonded to form a bonding portion J. Accordingly, a secure metallic bonding of the steel and aluminum can be obtained.

Figure 5:
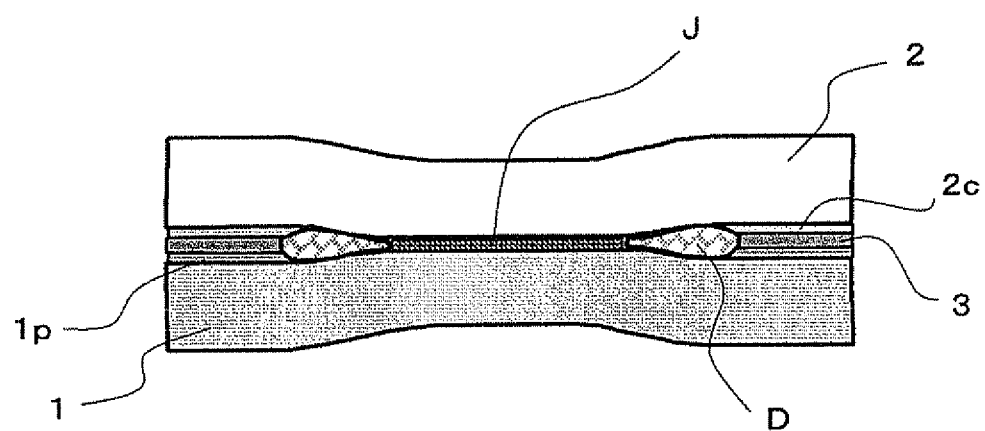
FIG. 5 is a cross-sectional view illustrating a bonding structure of dissimilar metals constructed in accordance with the present disclosure.

FIG. 5 illustrates a structure of a bonding portion obtained by the process disclosed herein, particularly by the bonding process discussed above. As shown in FIG. 5, at the bonding portion J of the steel of the zinc-plated steel sheet 1 and the aluminum alloy material 2, newly formed surfaces of these respective metals are directly bonded. Further, the eutectic fused body Me or the oxide film 2c and impurities of the bonding interface are discharged around the bonding portion J to form the discharging product D, while the seal material 3 is applied around the bonding portion J. Accordingly, a high strength bond can be obtained. In addition, the bonding portion J is enclosed with the discharging product D and the seal material 3 such that it is completely isolated from the corrosive environment. Accordingly, an excellent anti-corrosive property against the contacting corrosion can be obtained, thereby obtaining both high solidity and anti-corrosive property.

In this first embodiment, an adhesive with liquid or paste-like properties can be employed and used as the seal material 3. However, it should be noted that the seal material 3 is not limited thereto. That is, sheet-like adhesives are also contemplated. In such a case, since the viscosity of the sheet-like adhesive is high at room temperature, it may be difficult to discharge the seal material simply by pressing the welding electrodes. As such, this disclosure contemplates that the seal material can be deformation heated through a preliminary conduction to reduce the deformation resistance of the seal material, thereby easily and certainly discharging the seal material.

First Comparative Example

A bare steel sheet and the aluminum alloy material are bonded by repeating the operations similar to those of the first embodiment, except that the bare steel sheet lacks any zinc plating, and alternating current is conducted simultaneously while pressing the materials without applying the seal material thereto.

Second Comparative Example

The zinc-plated steel sheet and the aluminum alloy material are bonded by repeating the operations similar to those of the first embodiment, except that the alternating current is conducted simultaneously while pressing the materials without applying the seal material thereto.

Third Comparative Example

The zinc-plated steel sheet and the aluminum alloy material are bonded by repeating the operations similar to those of the first embodiment, except that the spot welding electrodes have flat shaped ends, and the alternating current is conducted simultaneously with pressing.

The strength and anti-corrosive property of the dissimilar metallic joint obtained from the respective comparative example was observed and compared with the dissimilar metallic joint obtained from the first embodiment. The results are shown in Table 1.

TABLE 1

|  | Material combination | Whether seal material is present | Whether seal material remains at bonding interface | Strength of joint | Anti-corrosive property |
| --- | --- | --- | --- | --- | --- |
| First comparative example | Bare steel sheet + 6000-class aluminum alloy | No | — | ○ | X |
| Second comparative example | Zinc-plated steel sheet + 6000-class aluminum alloy | No | — | ○ | X |
| Third comparative example | Zinc-plated steel sheet + 6000-class aluminum alloy | Yes | Yes | X | ○ |
| First embodiment | Zinc-plated steel sheet + 6000-class aluminum alloy | Yes | No | ○ | ○ |

As shown in Table 1, in the first and second comparative examples that do not employ seal material, the strength of the joint was excellent. However, the anti-corrosive property is compromised. Further, in the first comparative example using the bare steel sheet a more precise condition control is required compared to a case using the zinc-plated steel sheet. Accordingly, a proper condition range becomes extremely narrow.

Further, in the third comparative example, since the spot welding is performed without excluding the seal material from the bonding interface, the seal material is not completely discharged and rather remains at the bonding interface. Accordingly, the bonding strength is about 45% of that of the first embodiment.

In contrast, in the dissimilar metal joint obtained from the first embodiment, it was found that both high solidity and anti-corrosive property could be obtained by discharging the seal material 3, removing the oxide film due to eutectic fusion and directly bonding the newly formed surfaces.

Further, when observing the solidity of the joint, the tensile strength measured by JIS Z3136-1999 was evaluated as [○]

since it is greater than A-grade solidity defined by JIS Z3140-1989. Also, as for the anti-corrosive property, the evaluation through a unique corrosion promoting test showed that when the electrical corrosion does not occur, it is evaluated as [O].

Second Embodiment

Figure 6A:
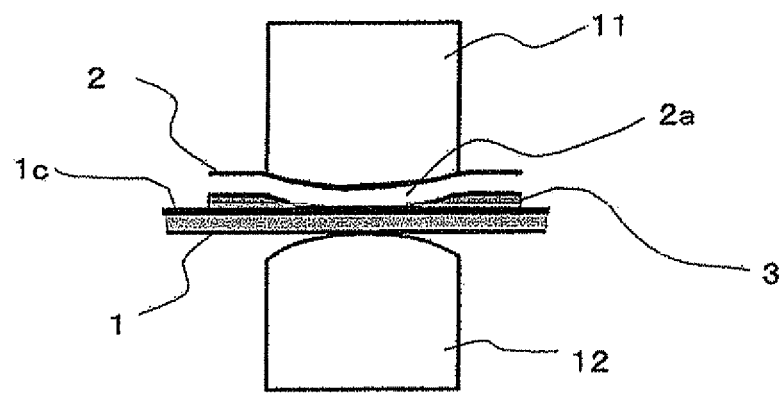
FIG. 6A is a cross-sectional view illustrating a resistance spot welding process when a bending portion is formed at an aluminum alloy material.

In the first embodiment, an example has been illustrated that facilitates a discharge of the seal material from the bonding portion or a reaction product generated during a bonding process using the welding electrodes having the convex surfaces at their ends. Alternatively, the same effects may be obtained when the bending portion having a predetermined curvature is formed on at least one bonding surface of the bonded material. In other words, in the present embodiment, as shown in FIG. 6A, the aluminum alloy material 2 having a bending portion 2a, which is formed in advance by pressing, is overlapped with the zinc-plated steel sheet 1. Further, the seal material 3 is interposed between the aluminum alloy material 2 and the zinc-plated steel sheet 1.

Additionally, the zinc-plated steel sheet 1 and the aluminum alloy material 2 are interposed between the electrodes 11 and 12. Under such a condition, when the pressing is performed, the seal material 3 is easily discharged from the bonding region by the bending portion 2a. Then, the resistance welding is performed by pressing and conducting in order to facilitate the breakage of the oxide film 2c of the aluminum alloy material 2 and the removal of the oxide film 2c from the bonding region. Therefore, a high anti-corrosive bond structure can be obtained, wherein the bonding portion is enclosed by the discharged material and/or the seal material.

As illustrated, the bending portion 2a is formed on the aluminum alloy material 2, which has a lower melting point than the steel sheet, and forms the secure oxide film on the surface under an ambient atmosphere. Accordingly, the bending portion 2a is softened and deformed by electrical conduction and heating so as to break and remove the oxide film 2c. Further, the reaction product produced by a eutectic reaction in the bonding process is easily discharged around the bonding region. Thus, the seal material 3 is easily discharged. In addition, a secure bond can be obtained since impurities are not interposed between the newly formed surfaces of the aluminum alloy and steel. Therefore, it can be appreciated that a highly anti-corrosive dissimilar metallic bond structure can be easily obtained, wherein the bonding region is enclosed with the discharged material and/or the seal material.

Figure 6B:
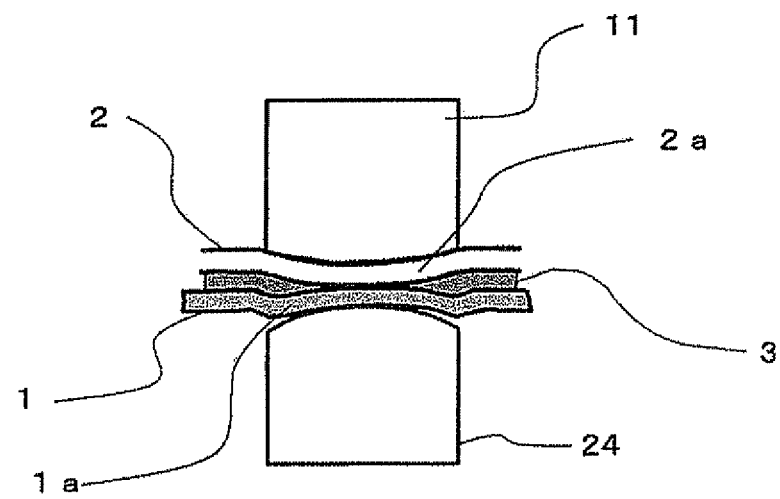
FIG. 6B is a cross-sectional view illustrating a resistance spot welding process when a bending portion is formed both at an aluminum alloy material and a zinc-plated steel sheet.

Further, when it is difficult to form the bending portion 2a on the aluminum alloy material 2 (e.g., when the thickness of the sheet of the aluminum alloy material is great or when the extrusion material is employed), the bending portion serving to facilitate a discharge of the seal material, etc., may be installed in the zinc-plated steel sheet 1 to obtain the same effects. Moreover, as shown in FIG. 6B, the same bending portions 2a and 1a may be formed both at aluminum alloy material 2 and zinc-plated steel sheet 1 such that the convex surfaces of the bending portions 2a and 1a are in contact with each other. By doing so, a discharging space serving as a discharging promoting means may be produced between both materials. In addition, discharging the seal material 3 or the reaction product can be facilitated to thereby perform a highly anti-corrosive and secure bond.

Third Embodiment

Figure 7:
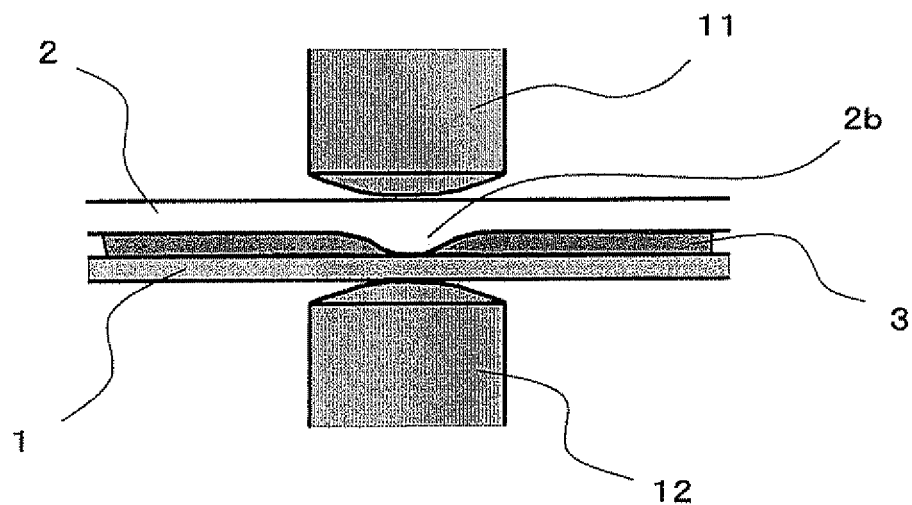
FIG. 7 is a cross-sectional view illustrating a resistance spot welding process when a thick bending portion is formed at an aluminum alloy material.

FIG. 7 illustrates an example wherein the bending portion 2b for facilitating the discharging of the seal material is formed as a thick portion on the aluminum alloy material 2. In other words, when the aluminum alloy material 2 is a cast material or an extrusion material, the thick bending portion 2b can be easily formed during a manufacturing process. Further, the seal material 3 as well as the reaction product can be easily discharged from the bonding interface. Therefore, the same effects as the above-mentioned embodiments can be obtained.

Fourth Embodiment

Figure 8:
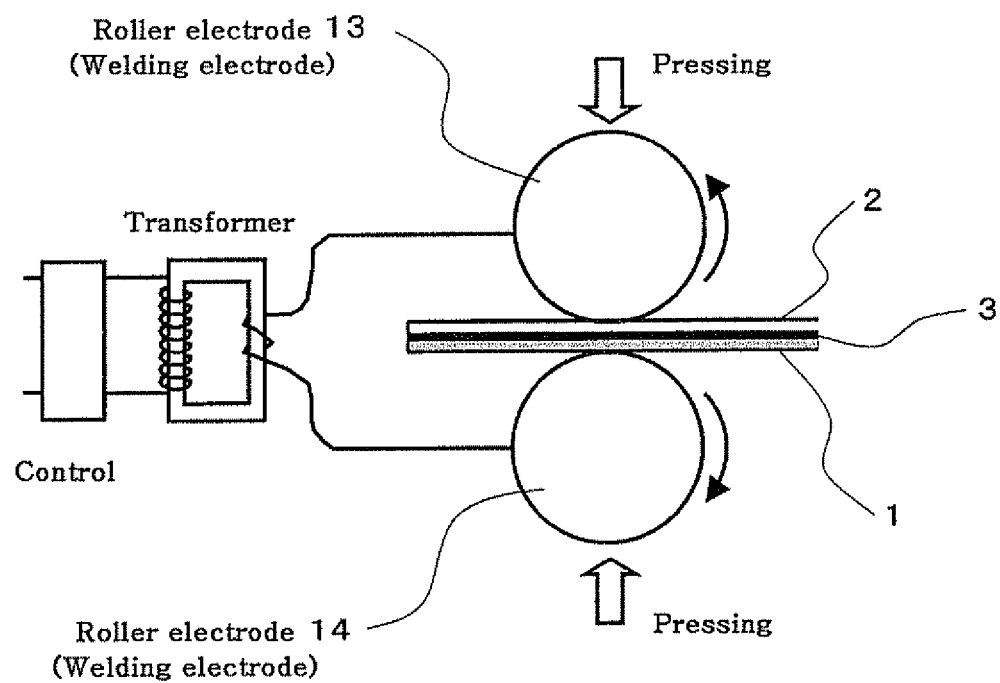
FIG. 8 is a schematic view illustrating a resistance seam welding apparatus constructed in accordance with an embodiment disclosed herein.

FIG. 8 illustrates a bonding method of the dissimilar metallic material by resistance seam welding.

The bonding device shown in FIG. 8 includes roller electrodes 13 and 14. The zinc-plated steel sheet 1 having the zinc-plated layer 1p on its surface and the aluminum alloy material 2 are overlapped and interposed between the roller electrodes 13 and 14. The seal material 3 is interposed between the zinc-plated steel sheet 1 and the aluminum alloy material 2. The bonding device is configured in such a manner that, after the seal material 3 is excluded from the bonding interface by pressing the bonding portion, the electrical current is conducted between both the zinc-plated steel sheet 1 and the aluminum alloy material 2, and the roller electrodes 13 and 14 are rotated. Accordingly, the discharging of the seal material 3 and the resistance welding are simultaneously performed so as to bond both the zinc-plated steel sheet 1 and the aluminum alloy material 2 in a linear-shape.

Figure 9:
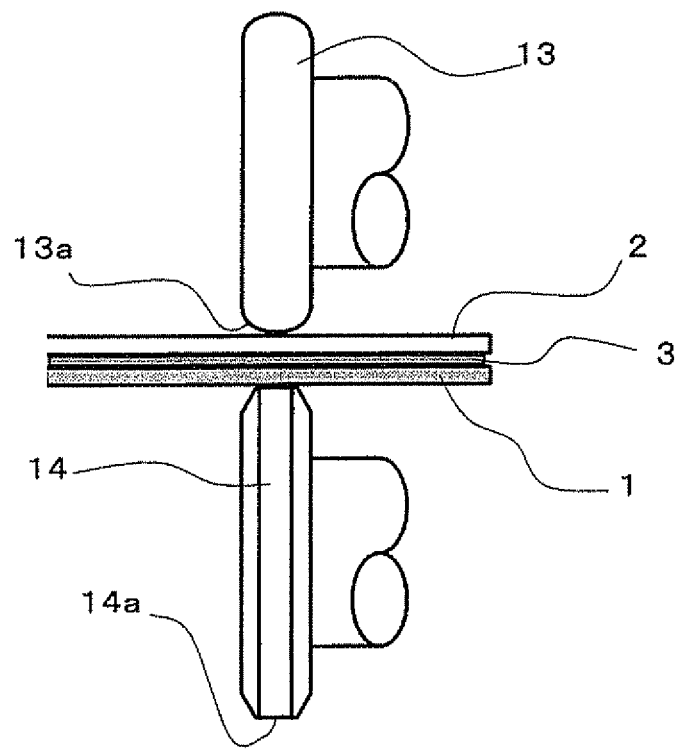
FIG. 9 is a schematic view illustrating an example of roller electrodes for use in resistance seam welding as disclosed herein.

In such a case, as shown in FIG. 9, at least one of the roller electrodes 13 and 14 includes a convex surface at the outer periphery, which contacts the bonded material [in the present embodiment, the upper roller electrode 13 includes a convex surface 13a and the end of the lower roller electrode 14 is formed with a flat surface 14a], and the roller electrode 14 is disposed at the aluminum alloy material 2.

Accordingly, in the present embodiment, a pressing force of 400 kgf is applied, and an alternating current of 32000 A is conducted while moving the materials at a feed speed of 2.0 m/min. Therefore, the seal material 3, oxide film, eutectic fused metal and/or reacting product is smoothly discharged from the bonding interface by the convex surfaces 13a of the roller electrode 13 in the same manner as the above-mentioned spot welding process. Further, a secure bond of the newly formed surfaces of the aluminum alloy and steel can be obtained. Also, an anti-corrosive property can be ensured by the seal material 3.

Fifth Embodiment

The fifth embodiment illustrates an example wherein the aluminum alloy material 2 having the bending portion similar to that of the second embodiment is applied to the resistance seam welding.

Figure 10:
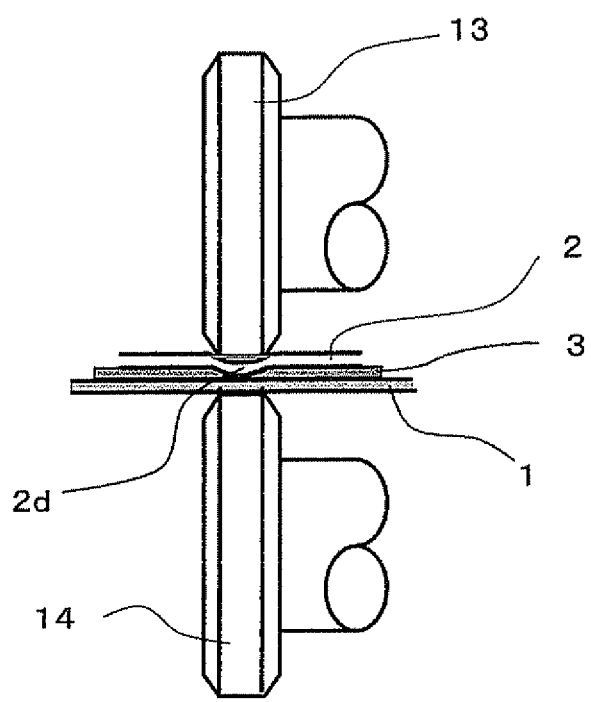
FIG. 10 is a cross-sectional view illustrating a resistance seam welding process when a bending portion is formed at a bonded portion.

In other words, as shown in FIG. 10, a continuous bead shape is formed along a longitudinal direction by pressing. The aluminum alloy material 2 having a bending region 2d is overlapped with the zinc-plated steel sheet 1, wherein the bending region 2d has a curvature such that it is convex towards the zinc-plated steel sheet 1. The seal material 3 is interposed between the aluminum alloy material 2 and the zinc-plated steel sheet 1.

The bending region 2d serves to facilitate a discharge of the seal material 3. Accordingly, similar to the above-mentioned spot welding process, any or all of the seal material 3, oxide film, eutectic fused metal reacting product, etc., is smoothly discharged from the bonding interface along its lateral directions. Therefore, a secure bond of the newly formed surfaces of the aluminum alloy and steel, as well as high anti-corrosive property, can be obtained under the above-mentioned conditions.

Although the conventional roller electrodes having flat shaped ends are employed as the roller electrodes 13 and 14, the roller electrodes having convex outer peripheral surfaces may be also used in the same manner as the above-mentioned embodiments. Further, similar to the spot welding process, the bending region may be installed in the zinc-plated steel sheet 1 or in both the zinc-plated steel sheet 1 and the aluminum alloy material 2.

By using the resistance seam welding processes of the fourth and fifth embodiments as disclosed herein, it is possible to achieve continuous bonding and obtain the dissimilar material joint having water-proof and/or anticorrosive properties and high rigidity in the bond region.

Sixth Embodiment

In the sixth embodiment as disclosed herein, an example is achieved that performs bonding of a sheet material 2 having a 1.0 mm thickness, made of a 6000-class aluminum alloy having an organic film 2f serving as a seal material on its one side, and a zinc-plated steel sheet 1 having a 0.55 mm thickness by resistance welding.

Figure 11A:
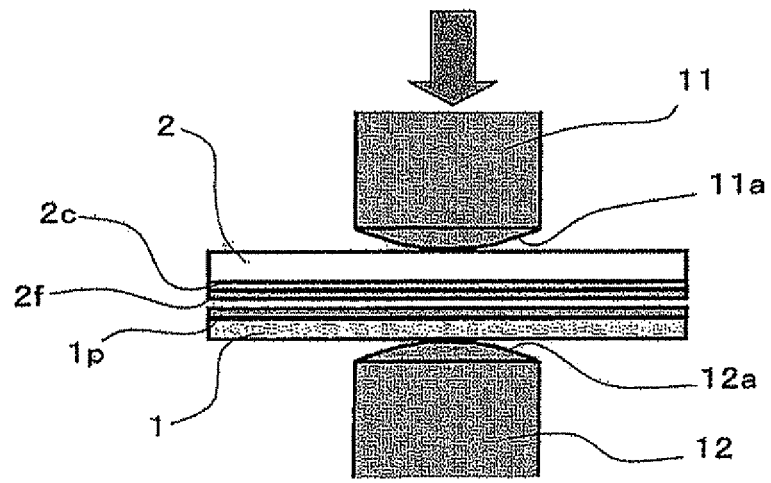
FIG. 11A is a cross-sectional view illustrating a resistance seam welding process for an aluminum alloy material provided with an organic film.
Figure 11B:
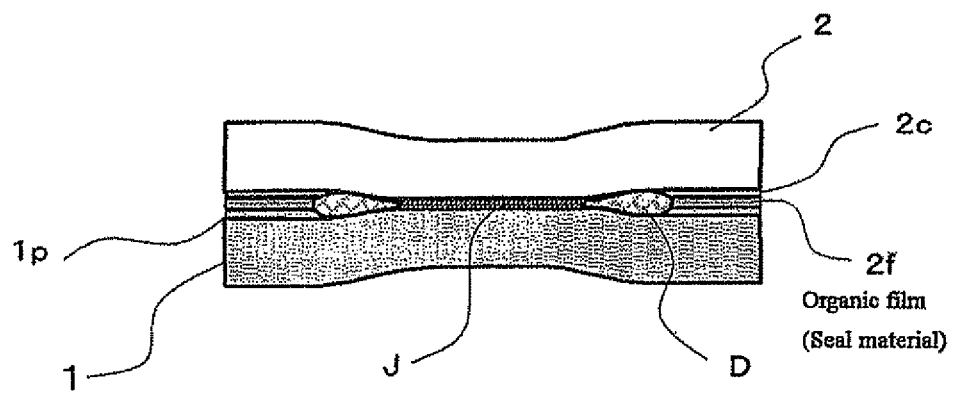
FIG. 11B is a cross-sectional view of a bonding structure obtained from the welding process shown in FIG. 11A.

FIG. 11A is a detailed cross-sectional view showing a bonding process. The zinc-plated layer 1p, aluminum oxide film 2c and organic film 2f (i.e., seal material) are interposed between the bonding interface of the zinc-plated steel sheet 1 having the zinc-plated layer 1p on the surface thereof and the aluminum alloy material 2 having the organic film 2f. Therefore, by applying the conditions similar to those of the first and second embodiments using the spot welding electrodes 11 and 12 having convex surfaces 11a and 12a at the ends, the organic film 2f is first discharged from the bonding interface to allow both the zinc-plated steel sheet 1 and the aluminum alloy material 2 to be directly contacted. In such a state, pressing and conducting are performed such that the bonding region J formed by directly bonding the steel of the zinc-plated steel sheet 1 and the aluminum alloy material 2 is enclosed with the discharge product D, as shown in FIG. 11B. Further, the organic film 2f is configured to enclose the surroundings and the surface of the aluminum alloy material 2. Accordingly, excellent anti-corrosive properties can be obtained due to the contact of the dissimilar metals.

In addition, at the bonding portion J of steel and aluminum alloy, the organic film 2f, eutectic fused body Me, oxide film 2c or discharge product D such as impurities of the bonding interface is discharged around it to obtain a high-strength bond of the newly formed surfaces. Accordingly, strength and anti-corrosive properties can be combined. As such, it is contemplated that the organic film 2f enclose around the discharging product D covering at least one surface of the bonded material as the seal material.

Seventh Embodiment

Here, an example will be explained wherein the zinc-plated steel sheet 1 having a 0.55 mm thickness and the sheet material 2 having a 1.0 mm thickness made of 6000-class aluminum alloy, including the organic films 1f and 2f serving as anti-corrosive seal materials, are bonded by resistance spot welding.

Figure 12A:
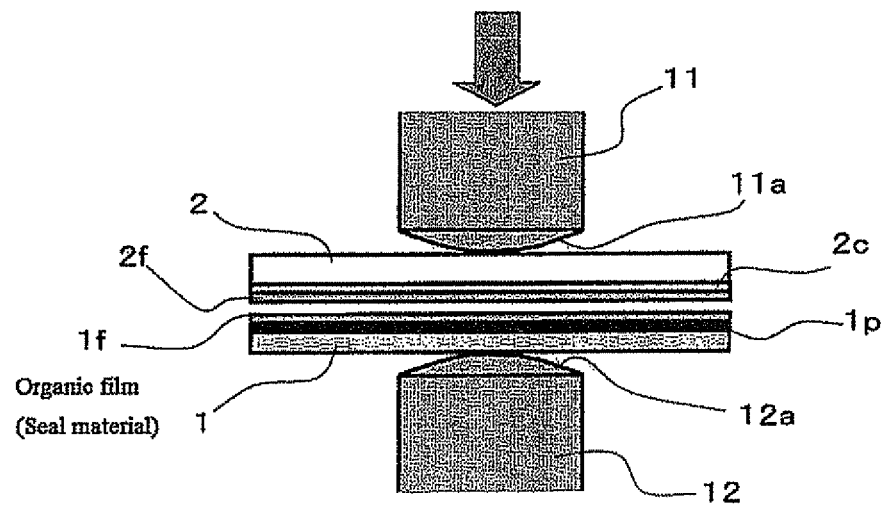
FIG. 12A is a cross-sectional view illustrating a resistance spot welding process of an aluminum alloy material provided with an organic film and a zinc-plated steel sheet.

As shown in FIG. 12A, the zinc-plated steel sheet 1 having the organic film 1f on the zinc-plated layer 1p and the aluminum alloy material 2 having the organic film 2f are overlapped such that each organic film becomes a bonding interface side.

At such bonding interface, as described in the above embodiments, the zinc-plated layer 1p, oxide film 2c of aluminum and organic films (seal materials) 1f and 2f are interposed.

Figure 12B:
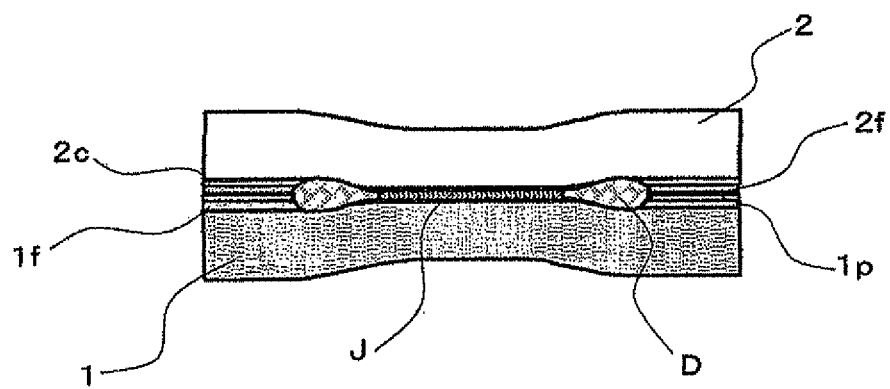
FIG. 12B is a cross-sectional view of a bonding structure obtained from the welding process shown in FIG. 12A.

Therefore, as explained above with respect to the first or sixth embodiment, by performing desired pressing and conducting after pressing the materials by using the spot welding electrodes 11 and 12 with the convex surfaces 11a and 12a at their ends, the discharge from the bonding interface of the organic films 1f and 2f followed by discharge of oxide film 2c or reaction product can be smoothly performed. Further, as shown in FIG. 12B, a bonding structure of dissimilar metals can be obtained basically in the same manner as in the above embodiments. Consequently, the dissimilar metallic joint exhibits both the joint strength and anti-corrosive property.

Eighth Embodiment

The present embodiment illustrates an example directed to a process of resistance seam welding the materials to be bonded in the same combination as the above sixth embodiment.

Figure 13:
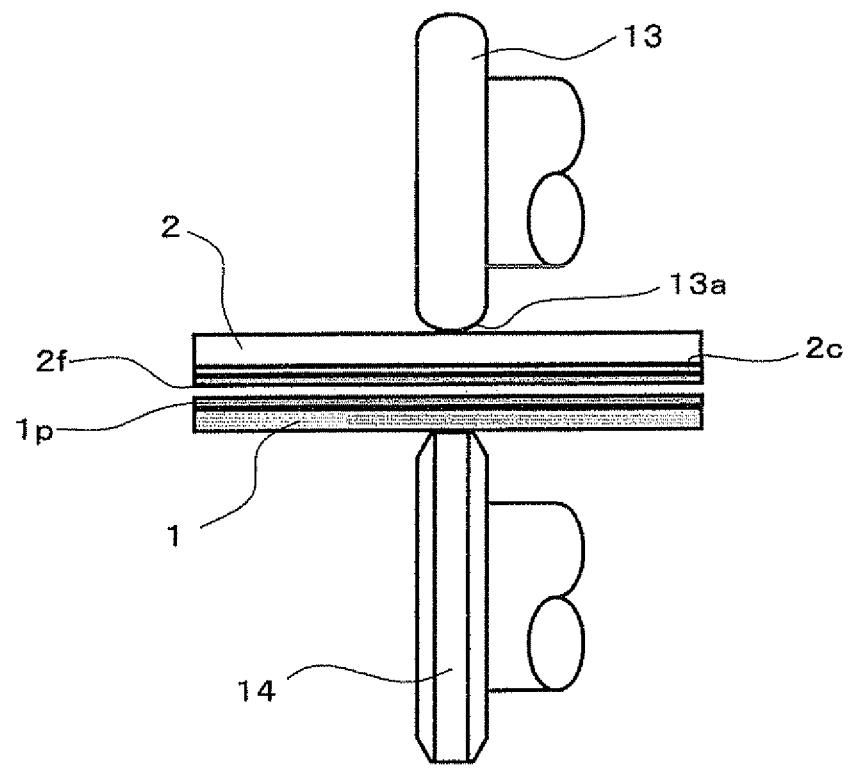
FIG. 13 is a cross-sectional view illustrating a resistance seam welding process for an aluminum alloy material provided with an organic film.

As a roller electrode for seam welding, as explained in the fourth embodiment and as shown in FIG. 13, the roller electrode 14 having the convex surface 13a on its outer periphery is employed. Further, by applying the same welding conditions as explained in the fourth embodiment, the discharge of organic film 2f or oxide film 2c or the reaction product from the bonding interface is smoothly performed, thereby obtaining both high-bonding solidity and anti-corrosive properties.

Further, by applying such a resistance seam welding process, a continuous bonding operation can be performed while a dissimilar material joint having excellent water-proof properties and rigidity in the bond region can be obtained.

Also, by using the materials on which the organic films are formed, a structure corresponding to a seal material can be uniformly formed. In this way, even a part that is difficult to weld can be easily processed.

Ninth Embodiment

As described in the above embodiments, the present embodiment illustrates an example of a bonding process in which a laser welding operation is performed on materials to be bonded, and the seal material 3 is interposed between the zinc-plated steel sheet 1 and the aluminum alloy material 2.

Figure 14A:
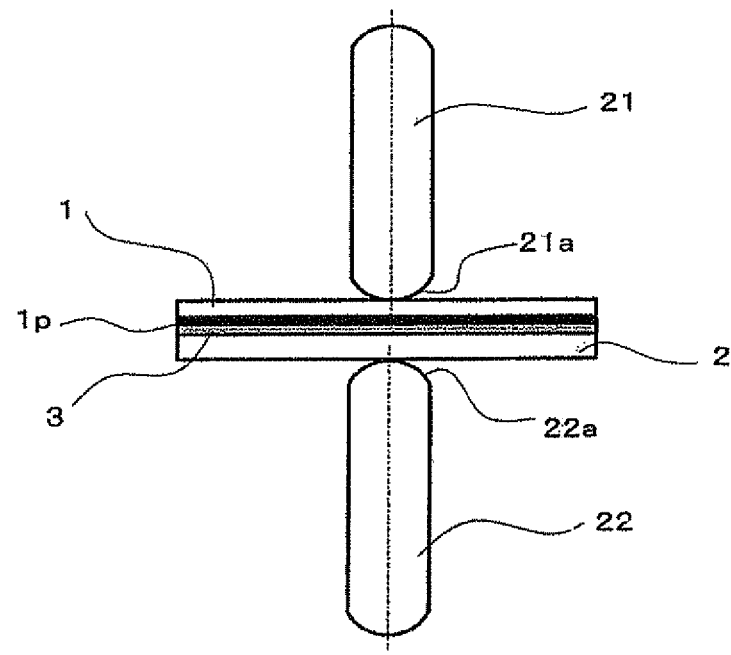
FIGS. 14A and 14B are front and side views illustrating a constitution of an apparatus for bonding dissimilar metals using laser welding in accordance with an embodiment disclosed herein.
Figure 14B:
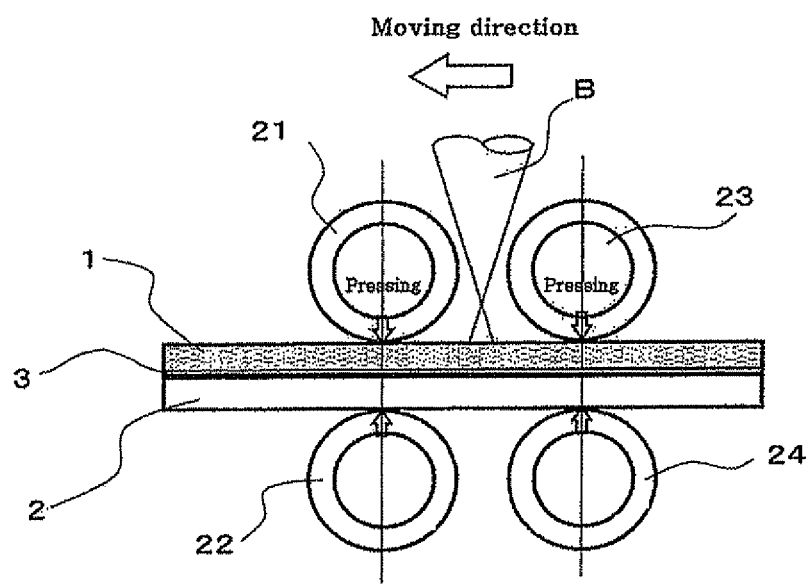

As a welding means of the bonding device, a YAG laser welding device with an oscillator having a maximum electric power of 3 kW is used. Further, as a heating device for reducing the deforming resistance of the seal material 3 and the pressing device for pressing the materials, a hot roller having a heater is used to perform a continuous welding operation. FIG. 14 illustrates a bonding device configuration in accordance with the present embodiment. FIGS. 14A and 14B are front and side views taken from a processing direction, respectively.

As a seal material discharging means, the bonding device shown in FIG. 14 includes: a pair of hot rollers 21 and 22 serving as both heating and pressing elements; an irradiating head (not shown) for irradiating a laser beam B by defocusing the beam from a laser oscillator at a position immediately after the hot rollers 21 and 22; and a pair of pressing rollers 23 and 24, which are disposed immediately after a beam irradiating area, for pressing materials to be bonded (heated by the laser beam).

The hot rollers 21 and 22 are configured to have convex curved surfaces 21a and 22a in their outer peripheries, which serve as pressure welding surfaces against the materials to be bonded, as shown in FIG. 14A. Further, the hot rollers 21 and 22 allow the roller body to be maintained at a high temperature by a built-in heater. Thus, since the seal material 3 between both the zinc-plated steel sheet 1 and the aluminum alloy material 2 is heated to be softened by a heat transfer at the same time when performing the pressing operation, a discharge from the bonding interface of the seal material 3 can be performed smoothly prior to the laser welding operation.

The pressing rollers 23 and 24 bond the zinc-plated steel sheet 1 and the aluminum alloy material 2 by transferring heat from the steel sheet side by compressing the zinc-plated steel sheet 1 heated by a beam irradiation with the aluminum alloy material 2. Where desired or required, in order to smoothly discharge materials such as a eutectic fused body or the oxide film during a bonding process, the outer peripheries of the pressing rollers may have convex surfaces in the same manner as the hot rollers 21 and 22.

By using such a bonding device, the zinc-plated steel sheet 1 and the aluminum alloy material 2 are bonded by performing the following operations. That is, while a pressing force of the preceding hot rollers 21 and 22 is adjusted to 160 MPa, its temperature is maintained at 90° C. Then, a pressing power of the succeeding pressing rollers 23 and 24 is adjusted to 120 MPa. Further, while the laser beam having an output of 1.0 kW is irradiated and defocused such that a spot diameter of 3.5 mm is formed on a surface of the zinc-plated steel sheet 1 at an intermediate position of the rollers, the laser beam is moved at a speed of 1.2 m/min relative to the rollers. Also, during the laser beam irradiation, the bonding portion is shielded by allowing argon gas to flow at a flow rate of 25 L/min.

Such a bonding operation proceeds basically via the process as illustrated in FIG. 4. However, in this embodiment, the zinc-plated steel material 1 and the aluminum alloy material 2 are vertically reversed.

That is, the materials to be bonded are disposed between a pair of the hot rollers 21 and 22. Thus, a deforming resistance of the seal material 3 is reduced by a heat transfer from the hot rollers 21 and 22. In such a state, if the materials to be bonded are pressed, the seal material 3 is discharged from a center portion of the bonding portion toward its lateral directions since the curved surfaces 21a and 22d are formed in the outer periphery of the hot roller. Accordingly, the zinc-plated layer 1p and the oxide film 2a of the aluminum alloy material surface are directly in contact at the center portion, as shown in (b) of FIG. 4.

Here, since mechanical shock caused by a pressing operation of the hot rollers 21 and 22 is applied, the oxide film 2a is locally destroyed as shown in (c) of FIG. 4.

Also, when zinc and aluminum locally contact each other and a bonding portion is heated by the irradiation of the laser beam B such that it is maintained at a temperature greater than the processing point of zinc and aluminum, eutectic fusion of zinc and aluminum occurs, thereby forming a melt body (melt metal) Me (shown in (e) of FIG. 4).

In such a state, if a pressing process by the pressing rollers 23 and 24 is performed thereon, then the oxide film 2c or impurities (not shown) of the bonding interface along with the eutectic fused body Me is discharged as a discharged material D around the bonding interface, thereby securing a desired bonding region (shown in (e) of FIG. 4).

Further, since newly formed surfaces of aluminum and steel are directly bonded at the bonding portion J, a secure metallic bonding of the steel and aluminum alloy can be obtained (shown in (f) of FIG. 4).

Since the bonding region J formed between a zinc-plated steel sheet 1 and the aluminum alloy material 2 is configured to be surrounded by the discharge D and the seal material 3, it is completely blocked from corrosion environment. Thus, superior anti-corrosive properties (against corrosion due to the contact of the dissimilar metals) can be obtained. Further, since the newly formed surfaces of the steel and aluminum alloy are directly bonded at the bonding region J, the seal material 3, eutectic fused body Me, oxide film 2c or various impurities during the bonding process are discharged from the bonding interface. Accordingly, the bond strength is also increased. Thus, both a high strength and anti-corrosion property of the dissimilar metallic joint can be obtained.

The above ninth embodiment provides an example for facilitating the discharge of the seal material from the bonding interface by using the hot rollers with the convex surfaces at its outer periphery. However, in case of a laser welding operation, the same discharging effects can be obtained by forming a bending portion having a predetermined curvature in at least one side of the bonding surfaces of the materials to be bonded.

Figure 15A:
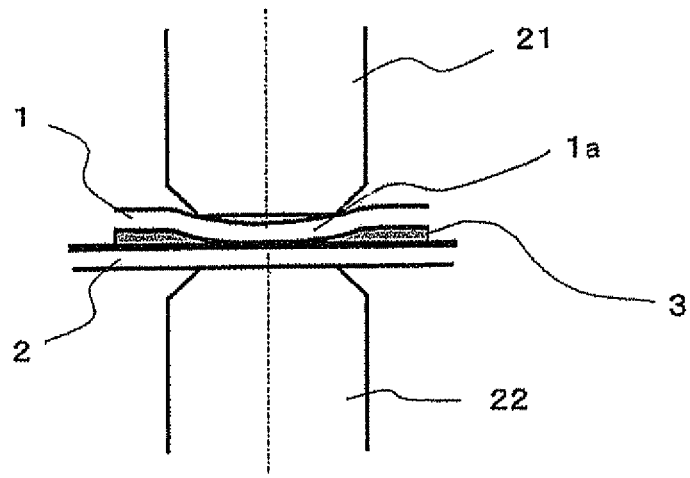
FIG. 15A is a cross-sectional view illustrating a laser welding process when a bending portion is formed at a zinc-plated steel sheet.
Figure 15B:
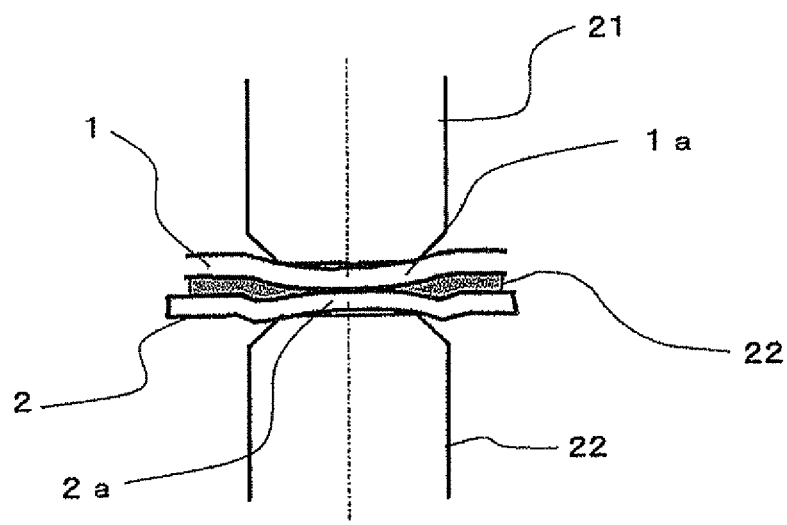
FIG. 15B is a cross-sectional view illustrating a laser welding process when a bending portion is formed at a zinc-plated steel sheet and an aluminum alloy material.

That is, as shown in FIG. 15A, for example, a continuous bending portion 1a may be formed along the welding direction in the zinc-plated steel sheet 1 by a pressing operation. Alternatively, as shown in FIG. 15B, identical bending portions 1a and 2a may be formed in the zinc-plated steel sheet 1 and the aluminum alloy material 2, respectively. In addition, by aligning the projections of the bending portions 1a and 2a to each other, as shown in the second and third embodiments, the seal material can be discharged more efficiently by a pressing operation of the hot rollers.

Figure 16:
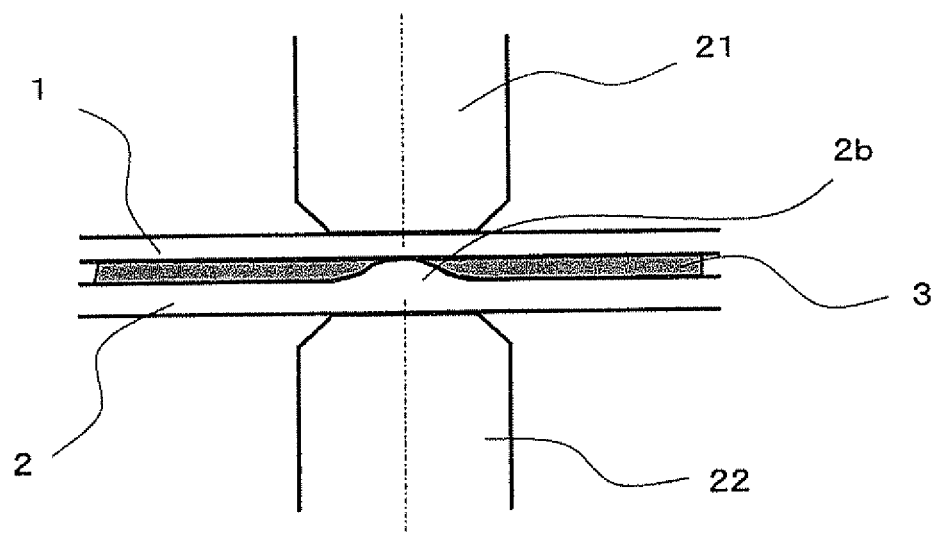
FIG. 16 is a cross-sectional view illustrating a laser welding process when a thick bending portion is formed at an aluminum alloy material.

Further, for example, in case the aluminum alloy material 2 is a casting material or extrusion material, as shown in FIG. 16, it is preferable to form the bending portion 2b having a portion thicker than the other portions, thereby obtaining the same effects.

Tenth Embodiment

This embodiment provides an example of substituting the bonding device used in the above ninth embodiment with a resistance seam welding machine.

Figure 17:
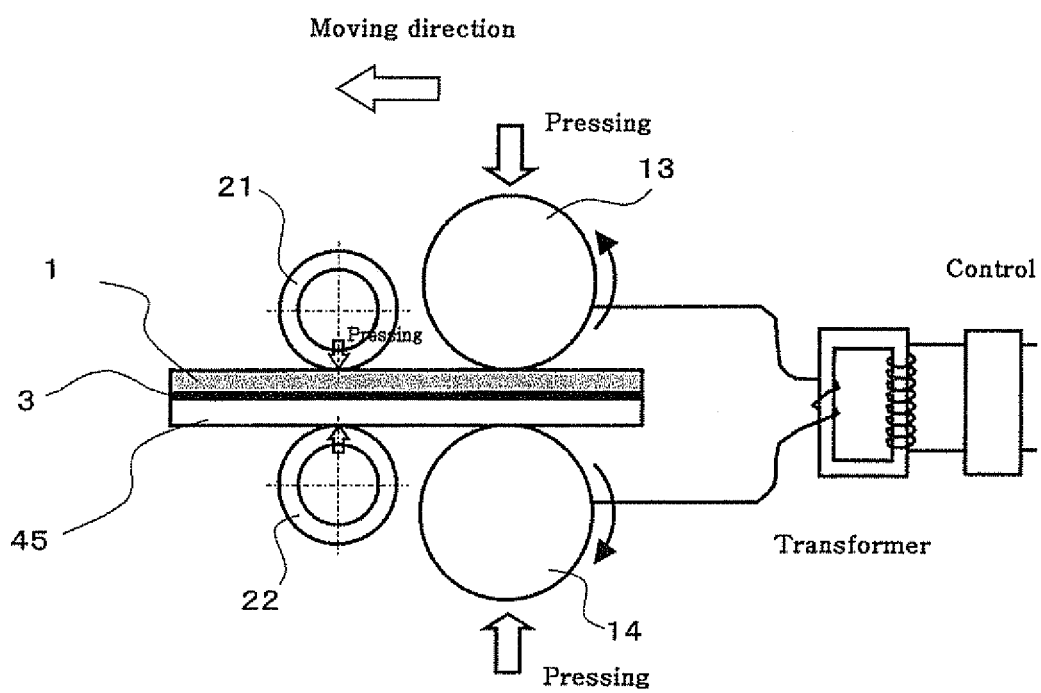
FIG. 17 is a side view illustrating an apparatus for bonding dissimilar metals using resistance seam welding in accordance with an embodiment as disclosed herein.

That is, FIG. 17 illustrates a bonding device construction used in the present embodiment. As a device for discharging a seal material, the bonding device shown in FIG. 17 includes the roller electrodes 13 and 14 connected to a power transformer for a resistance welding operation, along with a pair of hot rollers 21 and 22 having a built-in heater. This is similar to the device used in the ninth embodiment.

In the above bonding device, by heating and continuously pressing the bonding portion by the hot rollers 21 and 22, the seal material interposed between the zinc-plated steel sheet 1 and the aluminum alloy material 2 is discharged from the bonding interface. Further, the materials to be bonded are pressed by the roller electrodes 13 and 14, while both the zinc-plated steel sheet 1 and the aluminum alloy material 2 are electrically conducted. Accordingly, both metallic materials are configured to be bonded in a linear shape by continuously performing the resistance welding operation by rotating the roller electrodes 13 and 14.

In the present embodiment, while the temperature of the hot rollers 21 and 22 is maintained at 80° C., the pressing power thereof is adjusted to 120 MPa. Further, alternating current of 32000 A, which causes a pressing force of 400 kgf, is conducted between the roller electrodes 13 and 14 so as to be moved at a speed of 1.8 m/min relative to the materials. By doing so, as described in the above embodiments, while the seal material 3 is discharged in the lateral directions of the bonding line, the welding operation proceeds to exclude reaction products generated during the bonding process such that a preferred bonding structure can be obtained.

Eleventh Embodiment

Figure 18:
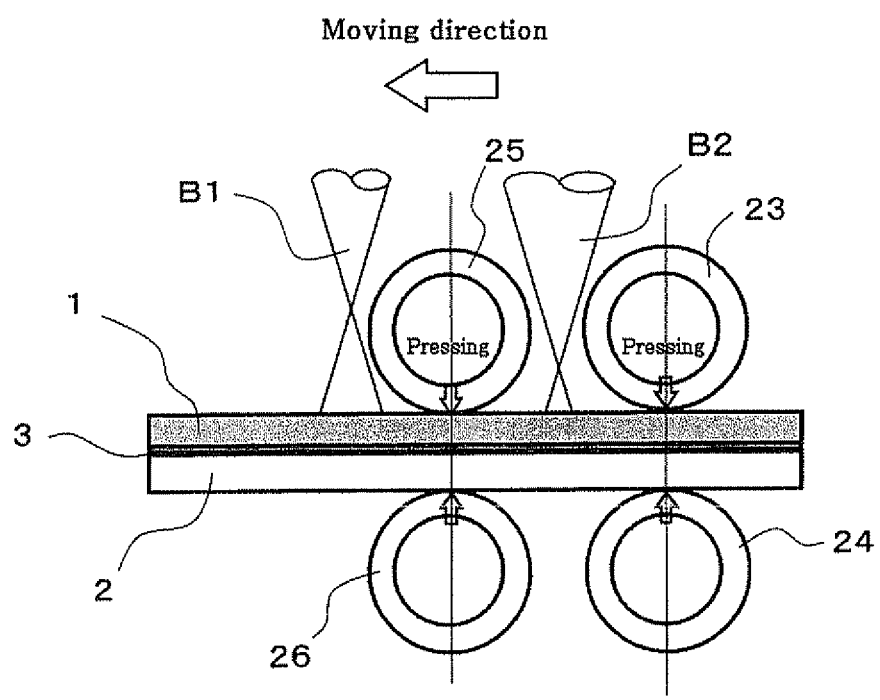
FIG. 18 is a side view illustrating a constitution of an apparatus for bonding dissimilar metals using laser welding in accordance with an embodiment as disclosed herein.

FIG. 18 illustrates a schematic depiction of a bonding device configuration used in the present preferred embodiment. Here, as a device for discharging a seal material, a defocused laser beam and a pressing roller are used. Further, as a welding device, a defocused laser beam and a pressing roller are used as well.

The bonding device shown in FIG. 18 includes a combination of the twin-beam YAG laser oscillator and two pairs of pressing rollers. In the bonding device, a preceding laser beam B1 is configured to heat the seal material 3 interposed between the zinc-plated steel sheet 1 and the aluminum alloy material 2 to reduce (soften) the deforming resistance. Thereafter, the seal material 3 is discharged to both sides of the welding direction by succeeding pressing rollers 25 and 26. Further, such laser beam B1 and pressing rollers 25 and 26 constitute a heating element and a pressing element in the device for discharging the seal material. Also, it is preferable to allow the outer periphery in one side or both sides of the pressing rollers 25 and 26 to be a convex curved surface as the hot roller 13.

Next, a subsequent laser beam B2 is irradiated on the zinc-plated steel sheet 1, which is in contact with the aluminum alloy material 2, by the discharge of the seal material 3. The zinc-plated steel sheet 1 heated at an operative temperature is compressed with the aluminum alloy material 2 by the pressing rollers 23 and 24. Further, the aluminum alloy material 2 is bonded to the zinc-plated steel sheet 1 by a heat transfer from the steel sheet side.

In the present embodiment, the pressing forces of the preceding pressing rollers 25 and 26 and the succeeding pressing rollers 23 and 24 are adjusted to 160 MPa and 120 MPa, respectively. The preceding laser beam B1 and the subsequent laser beam B2 are defocused to have spot diameters of 5.0 mm and 3.5 mm, respectively. Further, the laser output thereof is simultaneously adjusted to be 0.5 kW and 1.0 kW, respectively, while the moving speed is adjusted to be 1.2 m/min. By doing so, in addition to the discharge of the seal material 3 from the bonding interface, the discharge of its consequent oxide film or reaction products is smoothly performed such that a preferred dissimilar material joint can be obtained. Further, during the laser beam irradiation, a bonding portion is shielded by allowing argon gas to flow at a flow rate of 25 L/min.

Twelfth Embodiment

This embodiment provides an example wherein a heater built-in cylindrical indenter having both the functions of a heating element and a pressing element is used as a device for discharging seal material. After the seal material is discharged by the indenter, both materials are bonded by applying a resistance spot welding operation.

Figure 19:
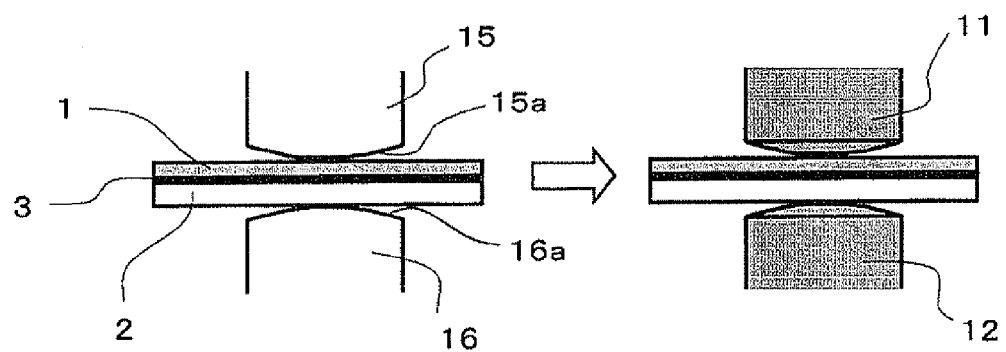
FIG. 19 illustrates a resistance spot welding process using a heater-installed cylindrical indenter as a seal material discharging means.

That is, FIG. 19 is a schematic view illustrating a bonding method in accordance with this embodiment. Leading pressure bonding surfaces of the cylindrical indenters 15 and 16 are formed to have convex curved surfaces 15a and 16a, respectively. Simultaneously, the indenters are configured to include a heater therein to heat the indenters themselves. Also, the seal material 3 inserted between the zinc-plated steel sheet 1 and the aluminum alloy material 3-2 is heated by the heat transfer from the heater. Then, the seal material 3 from the bonding interface is easily discharged by applying a pressing force thereto in a state where the seal material 3 is heated to be softened.

Here, curvatures of the indenters 15 and 16, which serve the function of seal discharging, may be determined independently from a tip end portion of the spot welding electrodes 11 and 12. This is so that the discharge of the seal material 3 and the welding operation are performed under optimum conditions. Thus, in addition to the discharge of the seal material 3 from the bonding interface, the discharge of the eutectic fusing, oxide film or impurities of the bonding interface can be efficiently performed.

In the present embodiment, by pressing with a pressing force of 450 kgf when adjusting the temperature of the indenters 15 and 16 at 80° C., the seal material 3 disposed between the zinc-plated steel sheet 1 and the aluminum alloy material 2 is excluded from the bonding interface. Simultaneously, the zinc-plated steel sheet 1 and the aluminum alloy material 2 can be preferably bonded by applying a pressing force of 350 kgf by using the welding electrodes 11 and 12 and conducting an alternating current of 25000 A for 0.2 second.

Further, in the twelfth embodiment the heater built-in cylindrical indenter is used as a heating device. However, instead of using such a heating type indenter, high frequency heating operation may be performed.

Figure 20:
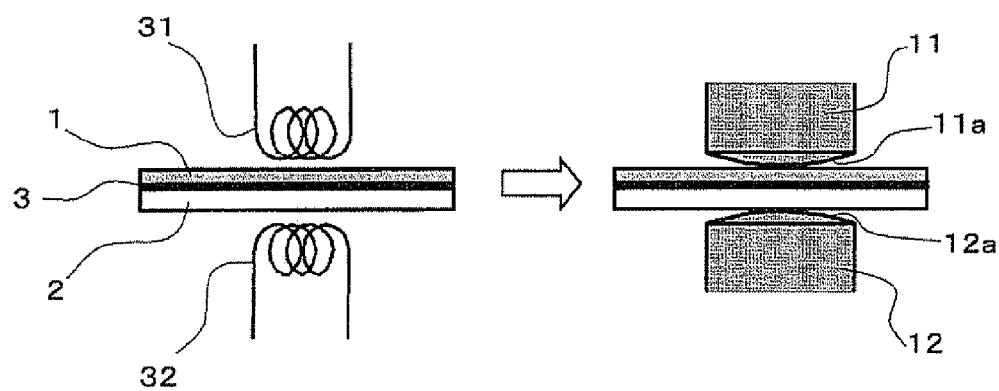
FIG. 20 illustrates a resistance spot welding process employing high-frequency heating as a heating means of the seal material discharging means.

As shown in FIG. 20, a bending portion of the materials to be bonded, which is formed by inserting the seal material 3 between the zinc-plated steel sheet 1 and the aluminum alloy material 2, is heated by high frequency coils 31 and 32. Then, the seal material 3 softened by the high frequency heating operation can be readily discharged from the bonding interface by inserting and heating the heated portion between a pair of spot welding electrodes 11 and 12.

Further, by pressing and electrically conducting the zinc-plated steel sheet 1 and the aluminum alloy material 2, which contact each other with the seal material 3 being discharged, the zinc-plated steel sheet 1 and the aluminum alloy material 2 can also be bonded as described above.

In such a case, as discussed above, a pressing operation for discharging the seal material is performed by the spot welding electrodes 11 and 12. The spot welding electrodes 1 and 12 also serve as a pressing element of the device for discharging the seal material.

Therefore, where desired or required, the tip end shape of the spot welding electrodes 11 and 12 can have the convex surfaces 11a and 12a as shown in the drawings.

While certain embodiments are described above, it is understood that the disclosure can include other embodiments and modifications without deviating from the subject matter or scope of the present invention. For example, while embodiments are directed to a first material (material 1) that is expressed as a single metal and the second material (material 2) that is expressed as an alloy that includes two or more metals or material mixed together, it is to be understood that the present disclosure is not to be limited to this combination. Non-limiting examples of suitable combinations considered within the purview of this disclosure include bonding of two dissimilar metals as well as bonding of two dissimilar metal alloys.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of bonding dissimilar metallic materials, comprising: overlapping a first material and a second material, the first material made from a different metal than the second material with a seal material interposed between the first material and the second material, forming an oxide film on the second material between the second material and the seal material; interposing a third metallic material different from both the first material and the second material between the first material and the seal material; pressing the first material and the second material with the interposed seal material and third metallic material together to discharge the seal material from a bonding interface to a periphery, contacting the oxide film with the third metallic material after the seal material is discharged, the oxide film being broken at the bonding interface during pressing to allow contact between the third metallic material and the second material; eutectically fusing the third metallic material with the second material at the bonding interface while pressing to produce a eutectic fused body; discharging the eutectic fused body from the bonding interface to the periphery with further pressing; and bonding the first material directly to the second material after the eutectic fused body has been discharged.

2. The method according to claim 1, wherein pressing is performed by an indenter having a convex surface at a press bonding surface.

3. The method according to claim 1, further comprising: reducing a deforming resistance of the seal material while the seal material is discharged from the bonding interface to the periphery.

4. The method according to claim 3 wherein the deforming resistance of the seal material is reduced by heating the first material and second material using an external heat source.

5. The method according to claim 1 wherein bonding the first material and the second material includes a resistance welding process.

6. The method according to claim 5 wherein the resistance welding process utilizes at least one welding electrode and wherein at least one end of a welding electrode has a convex surface.

7. The method according to claim 6 wherein the first material and the second material are bonded by a resistance spot welding process.

8. The method according to claim 6 wherein the first material and the second material are bonded by a resistance seam welding process.

9. The method according to claim 5, further comprising: reducing a deforming resistance of the interposed seal material when the seal material is discharged from the bonding interface to the periphery, the deforming resistance reduction occurring by performing a preliminary electrical conduction using the welding electrode.

10. The method according to claim 1 wherein one of the first material and the second material includes at least one of aluminum, aluminum alloys, magnesium, and magnesium alloys.

11. The method according to claim 10 wherein one of the first material and the second material contains iron.

12. The method according to claim 11 wherein one of the first material and the second material includes at least one of aluminum, aluminum alloys, magnesium, magnesium alloys, and wherein the other of the first material and the second material includes iron.

13. The method according to claim 1 wherein the third metallic material is at least one of zinc, copper, tin, silver, and nickel.

14. The method according to claim 1 wherein the first material and the second material are a zinc-plated steel sheet and an aluminum alloy plate respectively, and wherein the third metallic material is zinc that is plated to the first material.

15. The method according to claim 1 wherein the first material and the second material have different ionization tendencies from one another.

* * * * *